US008281006B2

(12) United States Patent  
Kikuchi

(10) Patent No.: US 8,281,006 B2  
(45) Date of Patent: Oct. 2, 2012

(54) CONNECTION STATE ESTIMATING DEVICE, CONNECTION STATE ESTIMATING METHOD AND STORAGE MEDIUM

(75) Inventor: Shunsuke Kikuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 179 days.

(21) Appl. No.: 12/732,402

(22) Filed: Mar. 26, 2010

(65) Prior Publication Data

US 2010/0250736 A1 Sep. 30, 2010

(30) Foreign Application Priority Data

Mar. 27, 2009 (JP) ................................. 2009-80285

(51) Int. Cl.
*G06F 15/173* (2006.01)
*H04J 11/00* (2006.01)
*H04L 12/28* (2006.01)
(52) U.S. Cl. .................. 709/224; 370/203; 370/255
(58) Field of Classification Search .................. None
See application file for complete search history.

(56) References Cited

U.S. PATENT DOCUMENTS 6,816,460 B1 * 11/2004 Ahmed et al. ................ 370/238
7,889,680 B2 * 2/2011 Chan et al. .................... 370/255

FOREIGN PATENT DOCUMENTS

JP 2007-158907 6/2007

* cited by examiner

*Primary Examiner* — Wen-Tai Lin
(74) *Attorney, Agent, or Firm* — Katten Muchin Rosenman LLP

(57) ABSTRACT

A connection state estimating method includes: acquiring a network distance between respective devices in a communication network; assuming branch point candidates at which three devices extracted from the network are connected together; calculating the network distance between each of the assumed branch point candidates and each of the three devices; classifying all the branch point candidates assumed to be connected with one of the devices into groups on the basis of the network distance between the one device and each branch point candidate; calculating representative values of the network distances between each device and branch point candidates assumed to be connected with the device; and selecting a device from the devices assumed to be connected with one of the branch point candidates and the representative value relating to the selected device.

12 Claims, 23 Drawing Sheets

FIG.11

| BRANCH POINT CANDIDATE ID | RTT BETWEEN BRANCH POINT CANDIDATE AND EACH OBSERVATION DEVICE | | | | | | ... |
|---|---|---|---|---|---|---|---|
| | A | B | C | D | E | F | |
| X1 | 10 | 12 | 15 | | | | |
| X2 | 10 | 12 | | 12 | | | |
| X3 | 10 | 12 | | | 25 | | |
| X4 | 10 | 12 | | | | 23 | |
| X5 | 10 | | 15 | 12 | | | |
| X6 | 10 | | 15 | | 25 | | |
| X7 | 10 | | 15 | | | 23 | |
| X8 | 10 | | | 12 | 25 | | |
| X9 | 10 | | | 12 | | 23 | |
| X10 | 25 | | | | 10 | 8 | |
| X11 | | 12 | 15 | 12 | | | |
| X12 | | 12 | | 12 | 25 | | |
| X13 | | 12 | 15 | | | 23 | |
| X14 | | 12 | | 12 | 25 | | |
| X15 | | 12 | | 12 | | 23 | |
| X16 | | 27 | | | 10 | 8 | |
| X17 | | | 15 | 12 | 25 | | |
| X18 | | | 15 | 12 | | 23 | |
| X19 | | | 30 | | 10 | 8 | |
| X20 | | | | 27 | 10 | 8 | |
| ... | | | | | | | |

FIG.12

| OBSERVATION DEVICE | CONNECTED? |
|---|---|
| A | CONNECTED |
| B | CONNECTED |
| C | CONNECTED |
| D | CONNECTED |
| E | NOT CONNECTED |
| F | NOT CONNECTED |

FIG.13

| BRANCH POINT CANDIDATE ID | CATEGORY ID | EVALUATION FLAG | RTT BETWEEN BRANCH POINT CANDIDATE AND EACH OBSERVATION DEVICE | | | | | |
|---|---|---|---|---|---|---|---|---|
| | | | A | B | C | D | E | F |
| X1 | | | 10 | 12 | 15 | | | |
| X2 | | | 10 | 12 | | 12 | | |
| X3 | | | 10 | 12 | | | 25 | |
| X4 | | | 10 | 12 | | | | 23 |
| X5 | | | 10 | | 15 | 12 | | |
| X6 | | | 10 | | 15 | | 25 | |
| X7 | | | 10 | | 15 | | | 23 |
| X8 | | | 10 | | | 12 | 25 | |
| X9 | | | 10 | | | 12 | | 23 |
| X10 | | | 25 | | | | 10 | 8 |

FIG.14

| BRANCH POINT CANDIDATE ID | CATEGORY ID | EVALUATION FLAG | RTT BETWEEN BRANCH POINT CANDIDATE AND EACH OBSERVATION DEVICE | | | | | |
|---|---|---|---|---|---|---|---|---|
| | | | A | B | C | D | E | F |
| X3 | | | 10 | 12 | | | 25 | |
| X6 | | | 10 | | 15 | | 25 | |
| X8 | | | 10 | | | 12 | 25 | |
| X12 | | | | 12 | 15 | | 25 | |
| X14 | | | | 12 | | 12 | 25 | |
| X17 | | | | | 15 | 12 | 25 | |
| X10 | | | 25 | | | | 10 | 8 |
| X16 | | | | 27 | | | 10 | 8 |
| X19 | | | | | 30 | | 10 | 8 |
| X20 | | | | | | 27 | 10 | 8 |

FIG.15

| BRANCH POINT CANDIDATE ID | CATEGORY ID | EVALUATION FLAG | RTT BETWEEN BRANCH POINT CANDIDATE AND EACH OBSERVATION DEVICE | | | | | |
|---|---|---|---|---|---|---|---|---|
| | | | A | B | C | D | E | F |
| X1 | C1 | SETTLED | 10 | 12 | 15 | | | |
| X2 | | | 10 | 12 | | 12 | | |
| X3 | | | 10 | 12 | | | 25 | |
| X4 | | | 10 | 12 | | | | 23 |
| X5 | | | 10 | | 15 | 12 | | |
| X6 | | | 10 | | 15 | | 25 | |
| X7 | | | 10 | | 15 | | | 23 |
| X8 | | | 10 | | | 12 | 25 | |
| X9 | | | 10 | | | 12 | | 23 |
| X10 | | | 25 | | | | 10 | 8 |

FIG.16

| BRANCH POINT CANDIDATE ID | CATEGORY ID | EVALUATION FLAG | RTT BETWEEN BRANCH POINT CANDIDATE AND EACH OBSERVATION DEVICE | | | | | |
|---|---|---|---|---|---|---|---|---|
| | | | A | B | C | D | E | F |
| X1 | C1 | SETTLED | 10 | 12 | 15 | | | |
| X2 | C1 | SETTLED | 10 | 12 | | 12 | | |
| X3 | C1 | SETTLED | 10 | 12 | | | 25 | |
| X4 | C1 | SETTLED | 10 | 12 | | | | 23 |
| X5 | C1 | SETTLED | 10 | | 15 | 12 | | |
| X6 | C1 | SETTLED | 10 | | 15 | | 25 | |
| X7 | C1 | SETTLED | 10 | | 15 | | | 23 |
| X8 | C1 | SETTLED | 10 | | | 12 | 25 | |
| X9 | C1 | SETTLED | 10 | | | 12 | | 23 |
| X10 | C1 | SETTLED | 25 | | | 12 | 10 | 8 |

FIG.17

| BRANCH POINT CANDIDATE ID | CATEGORY ID | EVALUATION FLAG | RTT BETWEEN BRANCH POINT CANDIDATE AND EACH OBSERVATION DEVICE | | | | | |
|---|---|---|---|---|---|---|---|---|
| | | | A | B | C | D | E | F |
| X1 | C1 | SETTLED | 10 | 12 | 15 | | | |
| X2 | C1 | SETTLED | 10 | 12 | | | | |
| X3 | C1 | SETTLED | 10 | 12 | | | 25 | |
| X4 | C1 | SETTLED | 10 | 12 | | | | 23 |
| X5 | C1 | SETTLED | 10 | | 15 | 12 | | |
| X6 | C1 | SETTLED | 10 | | 15 | | 25 | |
| X7 | C1 | SETTLED | 10 | | 15 | | | |
| X8 | C1 | SETTLED | 10 | | | 12 | 25 | 23 |
| X9 | C1 | SETTLED | 10 | | | 12 | | 23 |
| X10 | C1 | SETTLED | 25 | | | | 10 | 8 |

FIG.18

| BRANCH POINT CANDIDATE ID | CATEGORY ID | EVALUATION FLAG | RTT BETWEEN BRANCH POINT CANDIDATE AND EACH OBSERVATION DEVICE ||||||
| --- | --- | --- | --- | --- | --- | --- | --- | --- |
| | | | A | B | C | D | E | F |
| X1 | C1 | SETTLED | 10 | 12 | 15 | | | |
| X2 | C1 | SETTLED | 10 | 12 | | 12 | | |
| X3 | C1 | SETTLED | 10 | 12 | | | 25 | 23 |
| X4 | C1 | SETTLED | 10 | 12 | | | | |
| X5 | C1 | SETTLED | 10 | | 15 | 12 | | |
| X6 | C1 | SETTLED | 10 | | 15 | | 25 | 23 |
| X7 | C1 | SETTLED | 10 | | 15 | | | |
| X8 | C1 | SETTLED | 10 | | | 12 | 25 | |
| X9 | C1 | SETTLED | 10 | | | 12 | | 23 |
| X10 | C2 | SETTLED | 25 | | | 12 | 10 | 8 |

FIG.19

| BRANCH POINT CANDIDATE ID | CATEGORY ID | EVALUATION FLAG | RTT BETWEEN BRANCH POINT CANDIDATE AND EACH OBSERVATION DEVICE | | | | | |
|---|---|---|---|---|---|---|---|---|
| | | | A | B | C | D | E | F |
| X3 | C1 | SETTLED | 10 | 12 | | | 25 | |
| X6 | C1 | SETTLED | 10 | | 15 | | 25 | |
| X8 | C1 | SETTLED | 10 | | | 12 | 25 | |
| X12 | C1 | SETTLED | | 12 | 15 | | 10 | |
| X14 | C1 | SETTLED | | 12 | | 12 | 25 | |
| X17 | C1 | SETTLED | | | 15 | 12 | 25 | |
| X10 | C2 | SETTLED | 25 | 27 | | | 10 | 8 |
| X16 | C2 | SETTLED | | 27 | 30 | | 10 | 8 |
| X19 | C2 | SETTLED | | | | | 10 | 8 |
| X20 | C2 | SETTLED | | | | 27 | 10 | 8 |

FIG.20

| CATEGORY ID | RTT FROM BRANCH POINT TO EACH OBSERVATION DEVICE | | | | | |
|---|---|---|---|---|---|---|
| | A | B | C | D | E | F |
| C1 | 10 | 12 | 15 | 12 | 25 | 23 |
| C2 | 25 | | | | 10 | 8 |

FIG.21

| CATEGORY ID | RTT FROM BRANCH POINT TO EACH OBSERVATION DEVICE | | | | | |
|---|---|---|---|---|---|---|
| | A | B | C | D | E | F |
| C1 | 10 | 12 | 15 | 12 | 25 | |
| C2 | 25 | 27 | 30 | 27 | 10 | 8 |

FIG.22

| CATEGORY ID | RTT FROM BRANCH POINT TO EACH OBSERVATION DEVICE | | | | | |
|---|---|---|---|---|---|---|
| | A | B | C | D | E | F |
| Y1 | 10 | 12 | 15 | 12 | | |
| Y2 | | | | | 10 | 8 |

US 8,281,006 B2

CONNECTION STATE ESTIMATING DEVICE, CONNECTION STATE ESTIMATING METHOD AND STORAGE MEDIUM

CROSS-REFERENCE TO RELATED APPLICATION

This application is based upon and claims the benefit of priority from the prior Japanese Patent Application No. 2009-80285 filed on Mar. 27, 2009, the entire contents of which are incorporated herein by reference.

BACKGROUND

1. Field

Specific examples discussed hereinbelow relate to a technique for estimating a connection state between devices in a communication network including a plurality of devices.

2. Description of Related Art

It is very important for a user of a communication network to grasp the configuration (the topology and physical positions of nodes) of a network concerned in order to utilize the network and to cope with occurrence of a fault in the network.

On the other hand, in the case that the user intends to utilize a wide area network service provided by a network carrier, the carrier does not make public the internal structure of the network and hence it is difficult for the user to directly grasp the configuration of the network.

Thus, the user may be able to estimate the internal structure of a wide area network on the basis of a Round Trip Time (hereinafter, referred to as an RTT) taken for communication between devices (hereinafter, referred to as an RTT between devices) constituting a communication network concerned. That is, each RTT between respective ones of a plurality of user bases connected together over a wide area network and the number of branch points in the network, connecting relations thereof and their positions (RTTs between the respective branch points and between each branch point and each user base) are estimated on the basis of the calculated RTTs. Specifically, one branch point for connecting together a small number (for example, three) of user bases is assumed to try to find out any inconsistency in the calculated RTT or the assumption and trial are appropriately repeated to estimate the internal structure of the network. As another embodiment, in some cases, the internal structure of the network is estimated by performing empirical and geographical estimation in combination with the above method (see FIG. 1).

SUMMARY

A connection state estimating method includes: acquiring a network distance between respective devices in a communication network; assuming branch point candidates at which three devices extracted from the network are connected together; calculating the network distance between each of the assumed branch point candidates and each of the three devices; classifying all the branch point candidates assumed to be connected with one of the devices into groups on the basis of the network distance between the one device and each branch point candidate; calculating representative values of the network distances between each device and branch point candidates assumed to be connected with the device; and selecting a device from the devices assumed to be connected with one of the branch point candidates and the representative value relating to the selected device.

It is to be understood that both the foregoing summary description and the following detailed description are explanatory as to various embodiments of the present invention, and are not restrictive of the present invention as claimed.

BRIEF DESCRIPTION OF THE DRAWINGS

FIG. 11 illustrates a list of branch point candidates in a process according to an embodiment;

FIG. 12 illustrates a list of observation devices in a process according to an embodiment;

FIG. 13 illustrates a list of categories (illustrating a state before categorization in the case that an observation device A has been targeted) in a process according to an embodiment;

FIG. 14 illustrates a list of categories (illustrating a state before categorization in the case that an observation device E has been targeted) in a process according to an embodiment;

FIG. 15 illustrates a list of categories (illustrating a state that a categorizing process is being executed (a first state) in the case that the observation device A has been targeted) in a process according to an embodiment;

FIG. 16 illustrates a list of categories (illustrating a state that the categorizing process is being executed (a second state) in the case that the observation device A has been targeted) in a process according to an embodiment;

FIG. 17 illustrates a list of categories (illustrating a state that the categorizing process is being executed (a third state) in the case that the observation device A has been targeted) in a process according to an embodiment;

FIG. 18 illustrates a list of categories (illustrating a state that execution of the categorizing process is completed in the case that the observation device A has been targeted) in a process according to an embodiment:

FIG. 19 illustrates a list of categories (illustrating a state that execution of the categorizing process is completed in the case that the observation device E has been targeted) in a process according to an embodiment;

FIG. 20 illustrates a list of representative values of categories (in the case that the observation device A has been targeted) in a process according to an embodiment;

FIG. 21 illustrates a list of representative values of categories (in the case that the observation device E has been targeted) in a process according to an embodiment;

FIG. 22 illustrates a list of branch points in a process according to an embodiment.

DESCRIPTION OF EXAMPLE EMBODIMENTS

Summary of Connection State Estimating Device According to Embodiment

Figure 1:
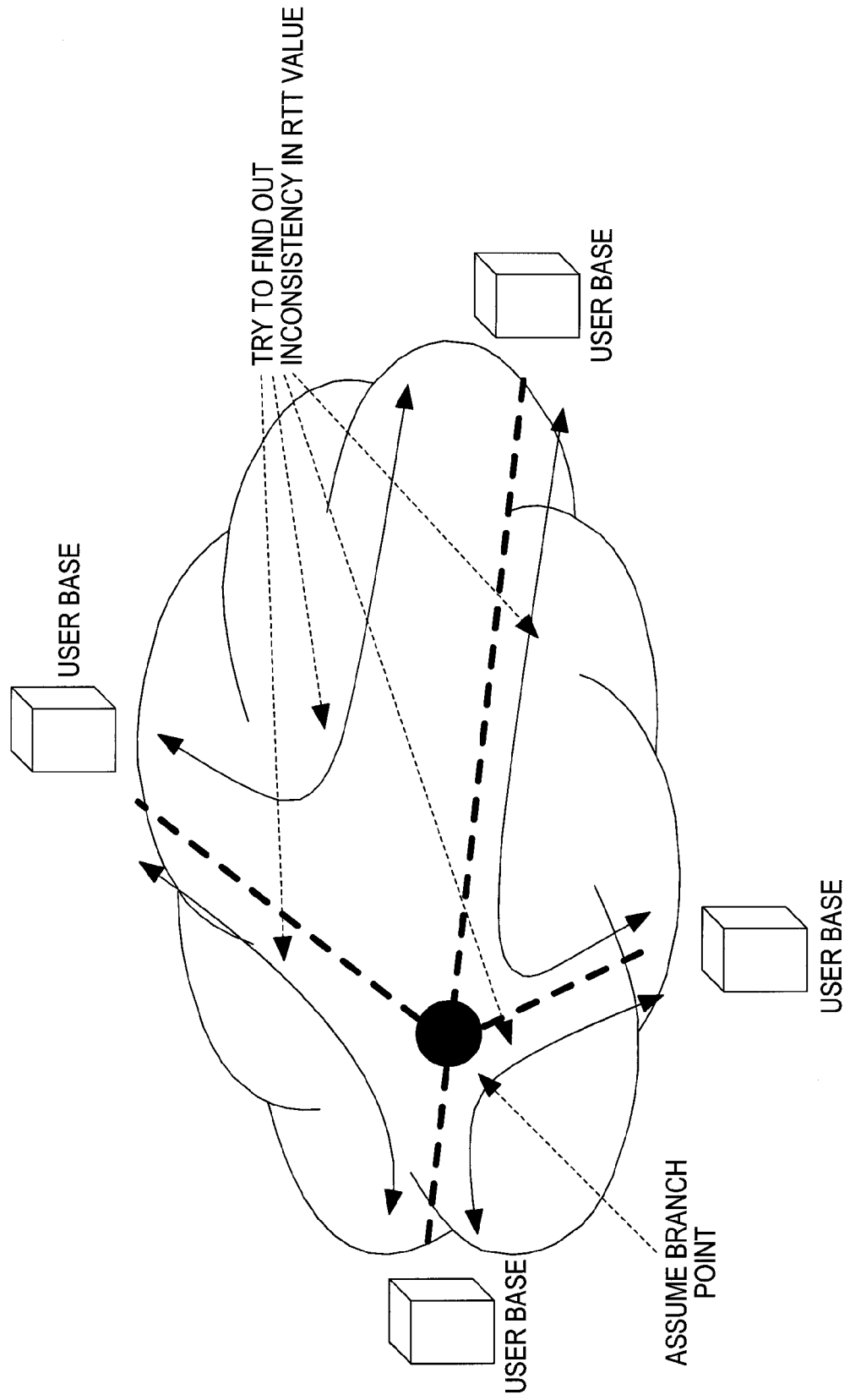
FIG. 1 illustrates related art of estimating a connection state in a network.
Figure 2:
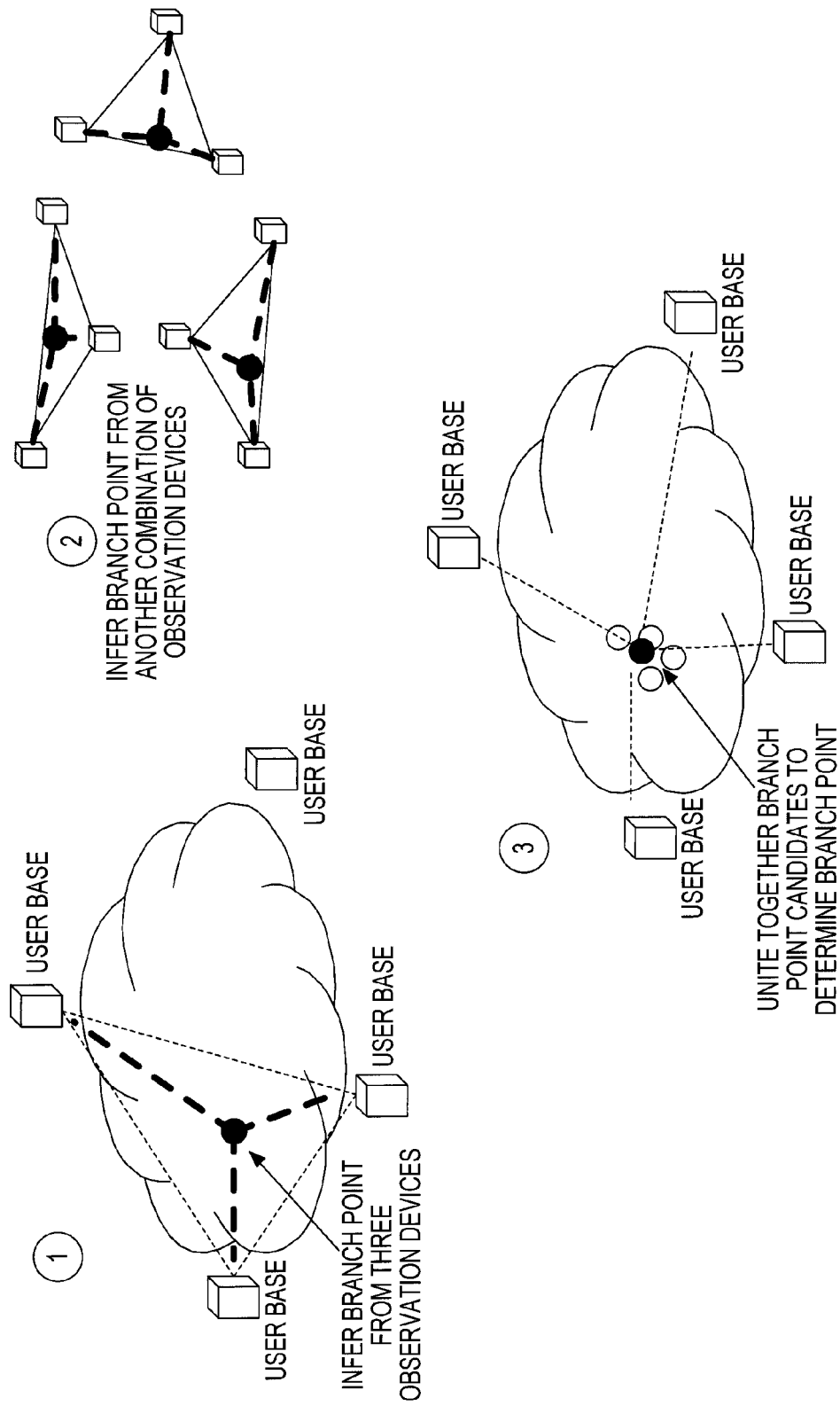
FIG. 2 illustrates an example of a process of estimating a connection state in a network according to an embodiment.
Figure 3:
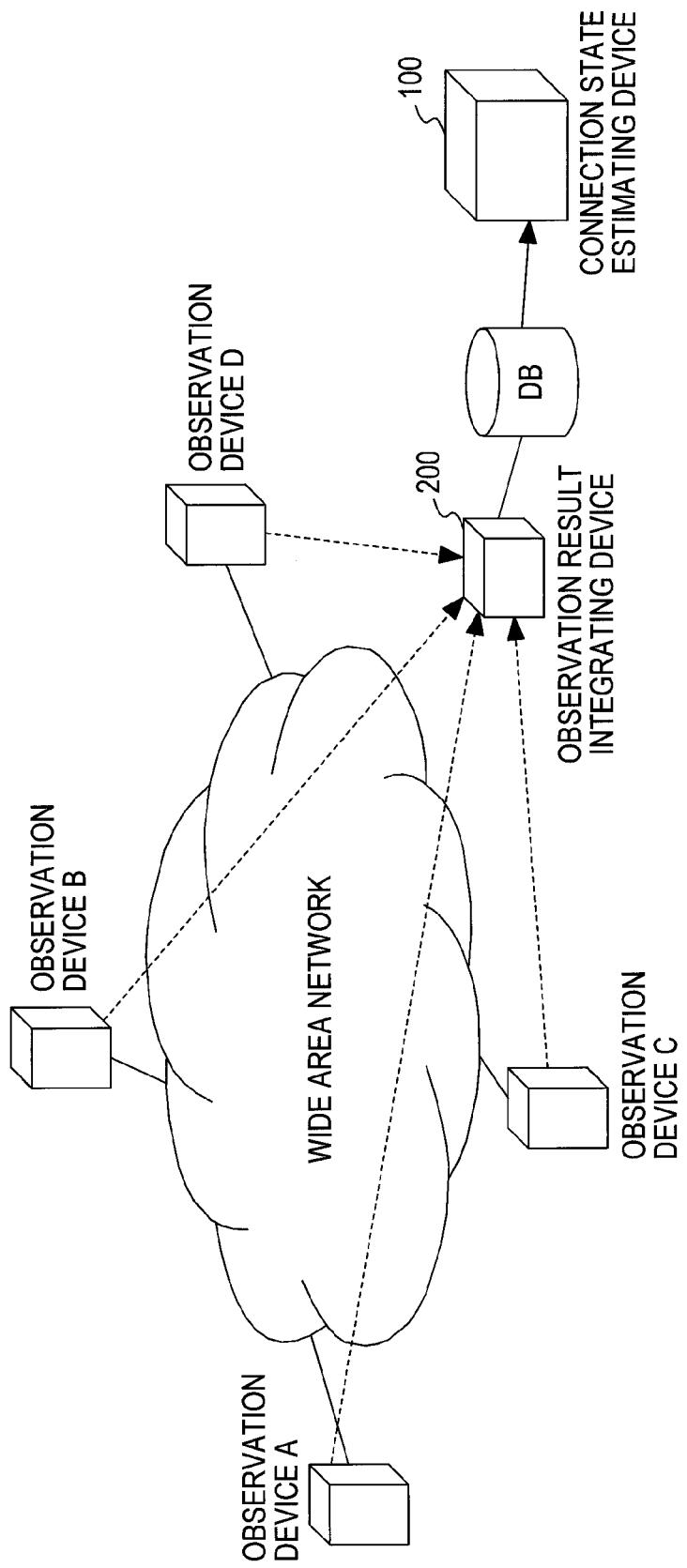
FIG. 3 illustrates a configuration of a system for estimating a connection state in a network including a connection state estimating device according to an embodiment.

The summary of a connection state estimating device 100 according to an embodiment will be described with reference to FIGS. 2 and 3. FIG. 2 illustrates schematic diagrams of a manner of estimating connection states between respective devices constituting a communication network using the connection state estimating device 100. FIG. 3 is a diagram illustrating a system configuration of the communication network and the connection state estimating device 100.

As illustrated in FIGS. 2 and 3, in order to estimate the connection states between the respective devices constituting the communication network, RTTs between respective observation devices disposed at respective locations of a wide area network are measured and results of measurement are gathered together at an observation result integrating device 200. Then, the connection state estimating device 100 performs the following processes on the observation (RTT measurement) results gathered at the observation result integrating device 200 to estimate connecting relations and RTTs between respective branch points and between each branch point and each observation device. Incidentally, although, in the example in FIG. 3, the observation result integrating device 200 and the connection state estimating device 100 are illustrated as different devices, the observation result integrating device 200 and the connection state estimating device 100 may be embodied as a single device.

(1) Acquisition of RTTs Between Observation Devices

First, the connection state estimating device 100 acquires RTTs between respective observation devices as objects whose connection states are to be estimated (hereinafter, referred to as estimating objects). For N observation devices as the estimating objects, data on the acquired RTTs is expressed in a data format arranged in a matrix of N×N. Incidentally, the RTT denotes a delay time generated for communication between the observation devices and the delay time may be either of a one-way trip or of a round trip as long as data attributes handled using the connection state estimating device 100 are unified.

(2) Assumption of Branch Point Candidate and Calculation of RTT Between Branch Point Candidate and Observation Device Next, the connection state estimating device 100 selects three devices from within all the observation devices in the network and assumes a branch point candidate to be connected with these three observation devices. Then, the connection state estimating device 100 calculates each RTT between each of these three observation device and the branch point candidate by working out an equation which will be described later.

In addition, the connection state estimating device 100 assumes branch point candidates with respect to all combinations of three observation devices selected from within all the observation devices in the network and calculates each RTT between each of three observation devices in each combination and each branch point candidate assumed for each combination of three observation devices. That is, for N observation devices serving as the estimating objects, $_NC_3$ branch point candidates are assumed.

(3) Unity of Branch Point Candidates

The connection state estimating device 100 targets on one observation device and unites together branch point candidates whose mutual distance is less than a predetermined threshold value. This process is performed on all the branch point candidates which are assumed to be connected with the targeted observation device. Then, the connection state estimating device 100 regards that an observation device, which is assumed to be connected with a branch point candidate that is not yet united with other candidates, is connected with a branch point candidate that has been already united with other candidates (hereinafter, referred to as a united branch point candidate).

Then, the connection state estimating device 100 executes the process of uniting together branch point candidates assumed to be connected with observation devices other than the observation device which is connected with the branch point candidate which has been united with other candidates by execution of the above mentioned process.

In the case that one united branch point candidate is obtained after execution of the above uniting process (3), the connection state estimating device 100 estimates that all the observation devices are connected with the above mentioned branch point candidate. In the case that two united branch point candidates are obtained after execution of the above uniting process (3), the connection state estimating device 100 estimates that these two branch point candidates are connected together and each observation device is connected with either one of them.

(4) Connection Between Branch Point Candidates

In the case that three or more united branch point candidates are obtained after execution of the above uniting process (3), the connection state estimating device 100 estimates that each observation device is connected with any one of these three branch point candidates, regards these branch point candidates as observation devices and then executes again the processes (2) and (3). In this case, the connection state estimating device 100 executes the processes (2) and (3) after calculation of the RTTs between the respective branch point candidates.

Figure 4:
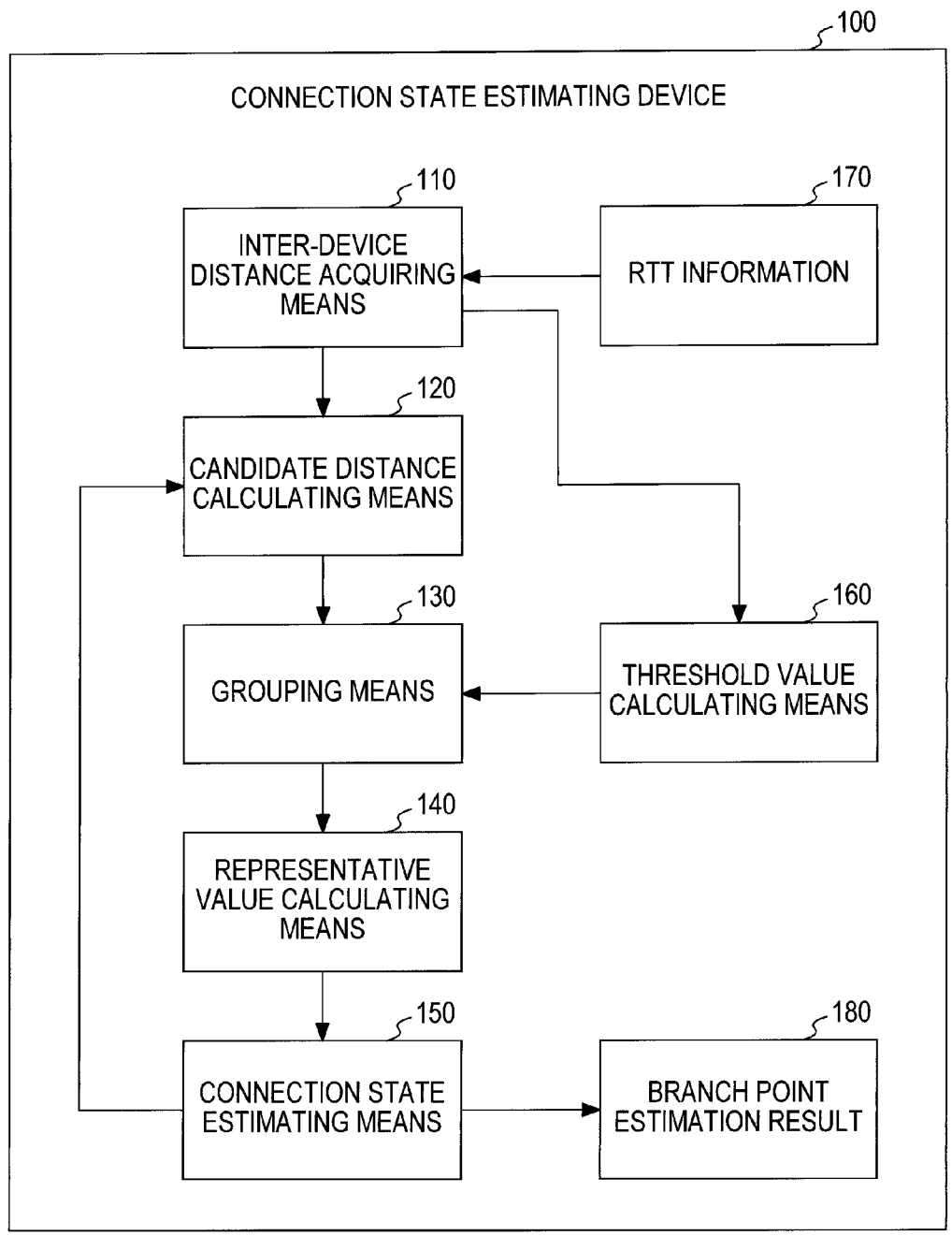
FIG. 4 is a functional block diagram of a connection state estimating device according to an embodiment.

As illustrated in FIG. 4, the connection state estimating device 100 includes inter-device distance acquiring means 110, candidate distance calculating means 120, grouping means 130, representative value calculating means 140, connection state estimating means 150 and threshold value calculating means 160. The inter-device distance acquiring means 110 executes the above mentioned process (1), the candidate distance calculating means 120 executes the above mentioned process (2), and the grouping means 130, the representative value calculating means 140 and the connection state estimating means 150 execute the above mentioned process (3). The threshold value calculating means 160 calculates a threshold value used in the grouping means 130.

Incidentally, the connection state estimating device 100 has a CPU (Central Processing Unit), a ROM (Read-Only Memory) and an HDD (Hard Disk Drive). Thus, the respective means included in the connection state estimating device 100 may be embodied to be implemented by making the CPU execute programs prepared corresponding to the respective means and stored in the ROM or the HDD. In addition, the respective means included in the connection state estimating device 100 may be embodied to implement the processes relating thereto in hardware.

Figure 5:
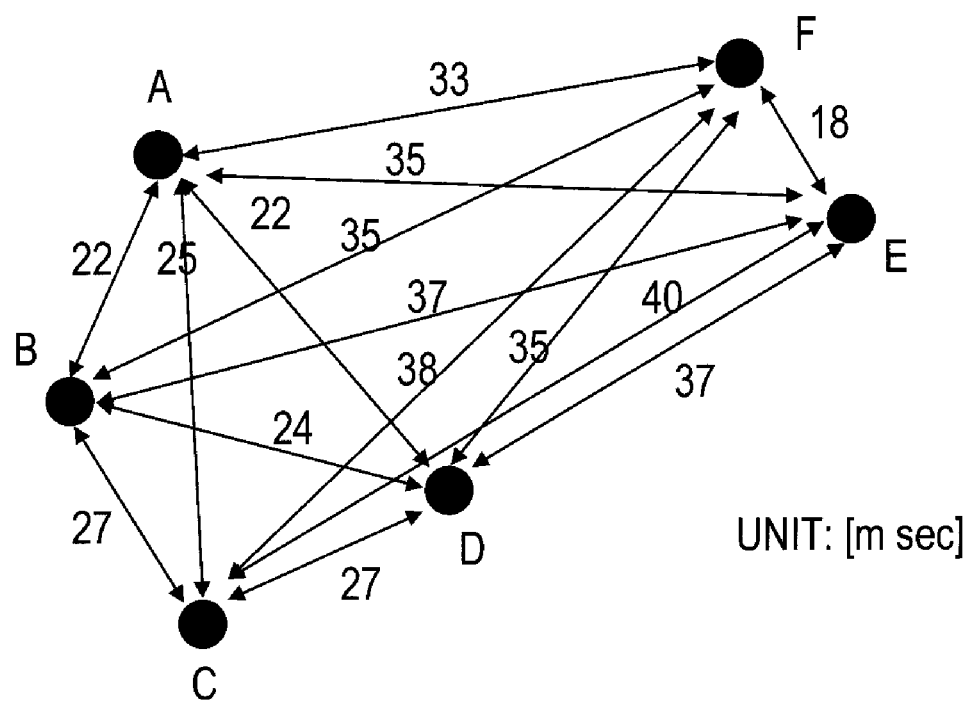
FIG. 5 illustrates RTTs between respective observation devices according to an embodiment.
Figure 10:
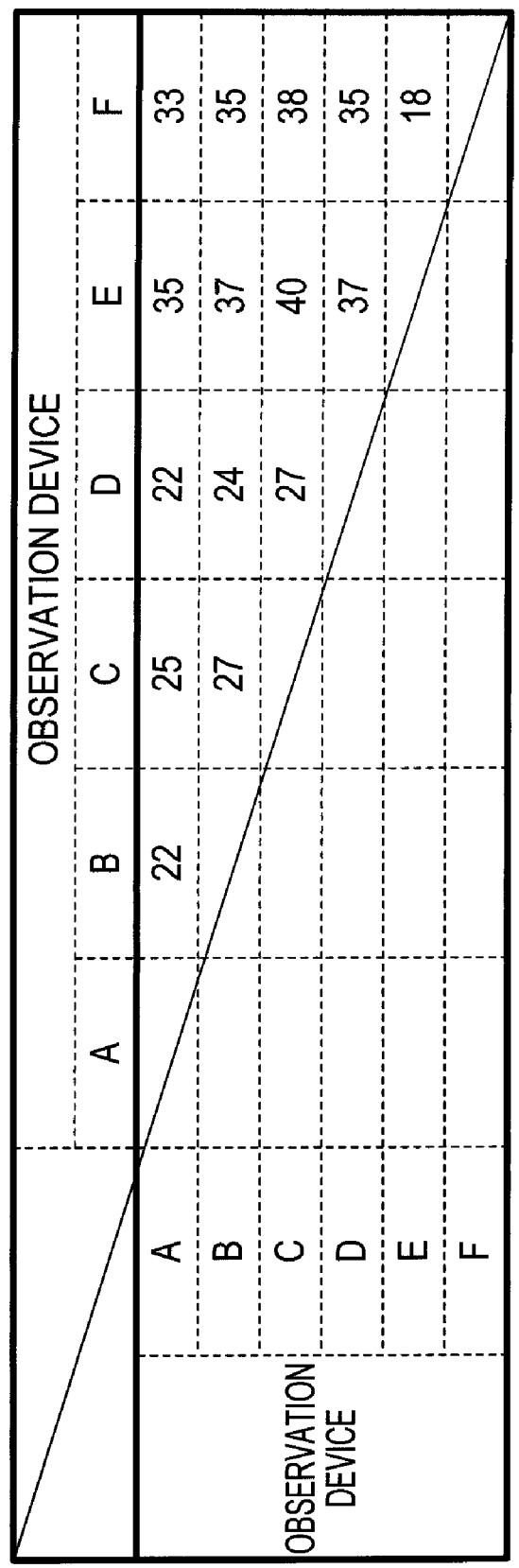
FIG. 10 illustrates RTTs between observation devices in a process according to an embodiment.

Examples of Processes Executed Using Connection State Estimating Device According to Embodiment Here, as illustrated in FIG. 5, description will be made assuming that six observation devices (A, B, C, D, E and F) are prepared as objects to be processed using the connection state estimating device 100 (hereinafter, referred to as processing objects of the connection state estimating device 100) and the RTTs between the respective observation devices are illustrated in FIG. 5. However, the number of observation devices as the processing object of the connection state estimating device 100 is not limited to six and the RTTs between the respective devices are not limited to the illustrated ones. FIG. 10 illustrates an example in which the RTTs between the respective observation devices as the processing objects are indicated in a data format arranged in a matrix of 6×6. The data format has the same upper and lower data structures and hence only the upper half structure is illustrated in the drawing. The example illustrated in FIG. 10 indicates that, for example, the RTT between the devices A and B is 22 (ms), the RTT between the devices A and C is 25 (ms) and the RTT between the devices B and C is 27 (ms).

Incidentally, symbols <A>, <B>, <C>, <D>, <E> and <F> illustrated in FIGS. 6 to 9 and used in the following description indicate transition relations between flowcharts illustrated in the respective drawings.

(1) Acquisition of RTT Between Observation Devices as Processing Objects

Figure 6:
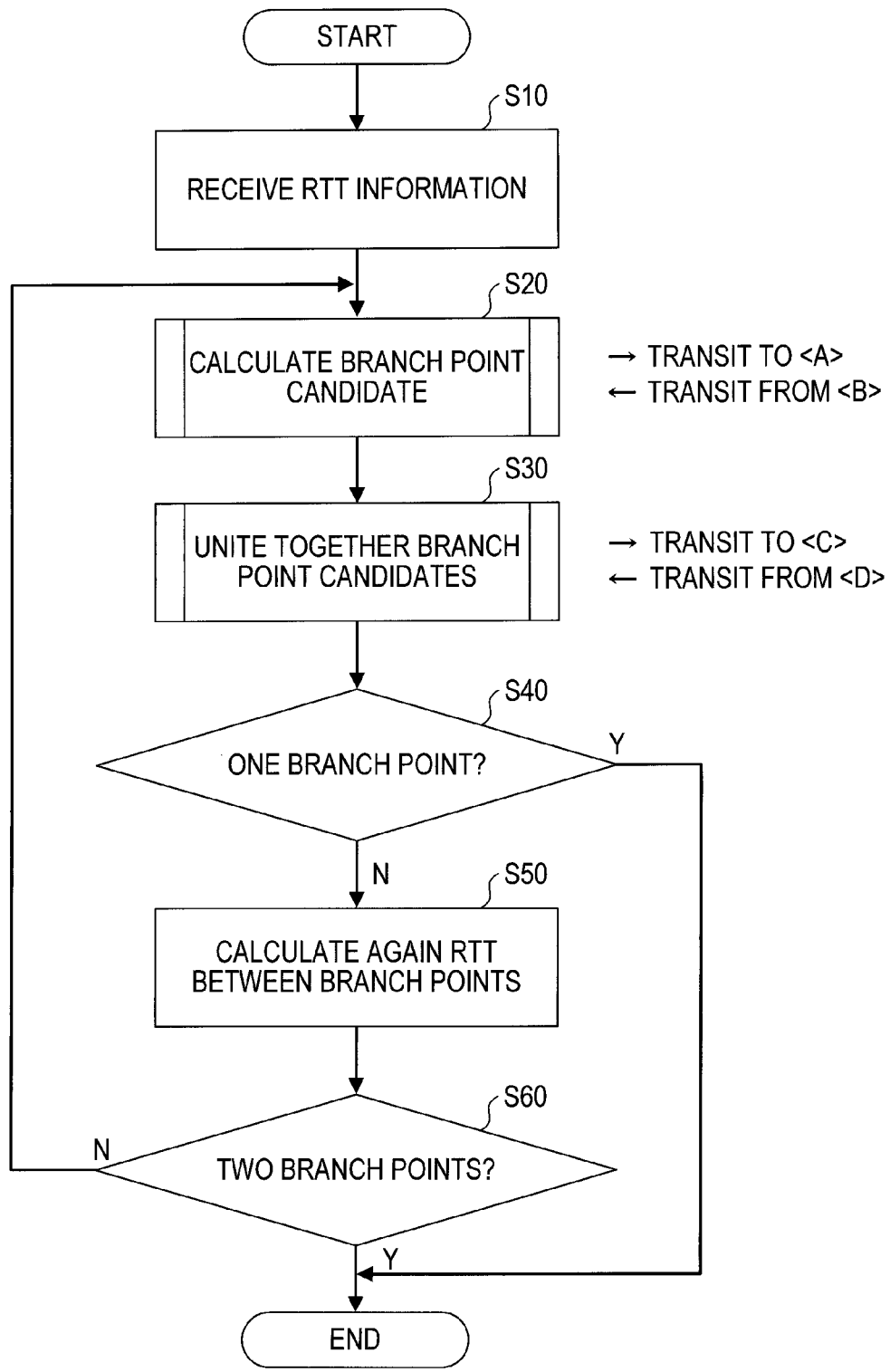
FIG. 6 is a flowchart illustrating the entire flow of a process according to an embodiment.

An RTT acquiring process will be described with reference to FIG. 6. At S10, the inter-device distance acquiring means 110 acquires RTT information 170 of the format arranged in a matrix of 6×6 as illustrated in FIG. 10 from respective observation devices or the observation result integrating device 200. In the example illustrated in the drawing, the RTT is a propagation delay time taken for communication between the respective observation devices and may be either of a one-way trip or of a round trip as long as data attributes handled using the connection state estimating device 100 are unified.

Figure 7:
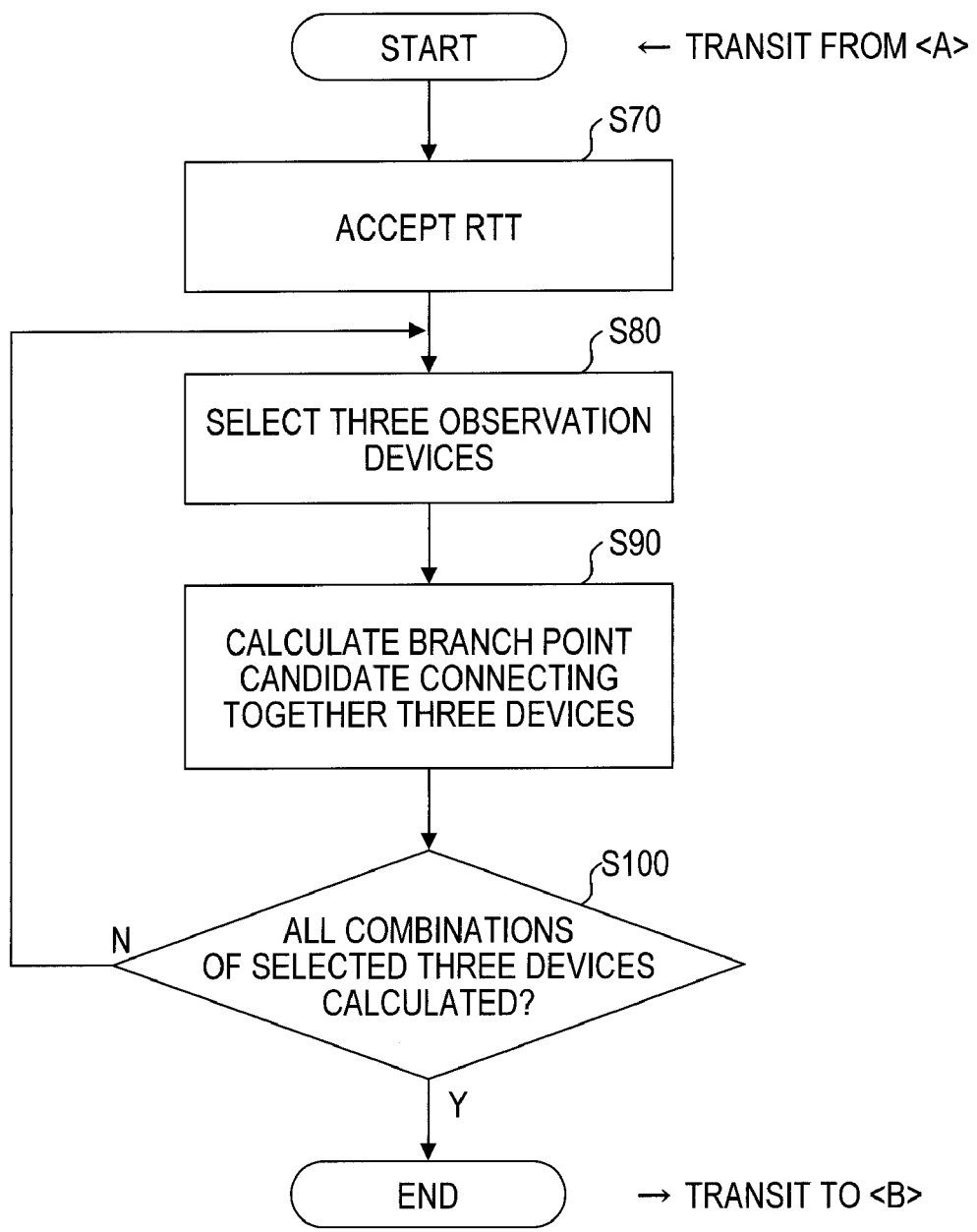
FIG. 7 is a flowchart of a process of assuming a candidate for branch point (hereinafter, referred to as a branch point candidate) and calculating each RTT between the branch point candidate and each observation device according to an embodiment.

(2) Assumption of Branch Point Candidate and Calculation of RTT Between Branch Point Candidate and Observation Device A process of assuming a branch point candidate and calculating the RTT between the assumed branch point candidate and each observation device will be described with reference to FIGS. 6 and 7. At S20, the candidate distance calculating means 120 executes the process of assuming the branch point candidate and calculating the RTT between the assumed branch point candidate and each observation device. Next, the process executed using the candidate distance calculating means at S20 will be described in detail.

At S70, the candidate distance calculating means 120 acquires the RTT information 170 illustrated in FIG. 10. Then, at S80, the candidate distance calculating means 120 selects three devices (for example, the devices A, B and C) from within all the observation devices and assumes a branch point candidate (for example, a candidate X1) for connecting together these three observation devices. Then, at S90, the candidate distance calculating means 120 calculates the RTT between each observation device and the branch point candidate on the basis of the RTTs between the respective ones of the selected three observation devices and writes the calculated RTTs in a table as illustrated in FIG. 11.

The case in which three observation devices A, B and C are selected and the branch point candidate X1 is assumed to connect together these three observation devices at S80 will be considered by way of example. If the RTT between the devices A and B is α(ms), the RTT between the device B and C is β(ms), the RTT between the device A and C is γ(ms) and the RTT between the candidate X1 and the device A is a (ms), the RTT between the candidate X1 and the device B will be expressed as α-a (ms) and the RTT between the candidate X1 and the device C will be expressed as γ-a (ms). In this situation, [RTT between the candidate X1 and the device B]+[RTT between the candidate X1 and the device C]=[RTT between the devices B and C], so that (α-a)+(γ-a)=β. Thus, since the values α, β and γ are known, a (ms) indicative of the RTT between the candidate X1 and the device A may be obtained. Once a (ms) is obtained, α-a indicative of the RTT between the candidate X1 and the device B and γ-a indicative of the RTT between the candidate X1 and the device C may be calculated.

Then, the candidate distance calculating means 120 executes the processes at S80 and S90 concerning all combinations of three devices extracted from all the observation devices (S100). In the case that six observation devices are prepared as illustrated in the process example, the candidate distance calculating means 120 assumes branch point candidates amounting to $_6C_3$=20, calculates the RTT between each branch point candidate and each observation device and prepares a table as illustrated in FIG. 11.

(3) Uniting of Branch Point Candidates

Figure 8:
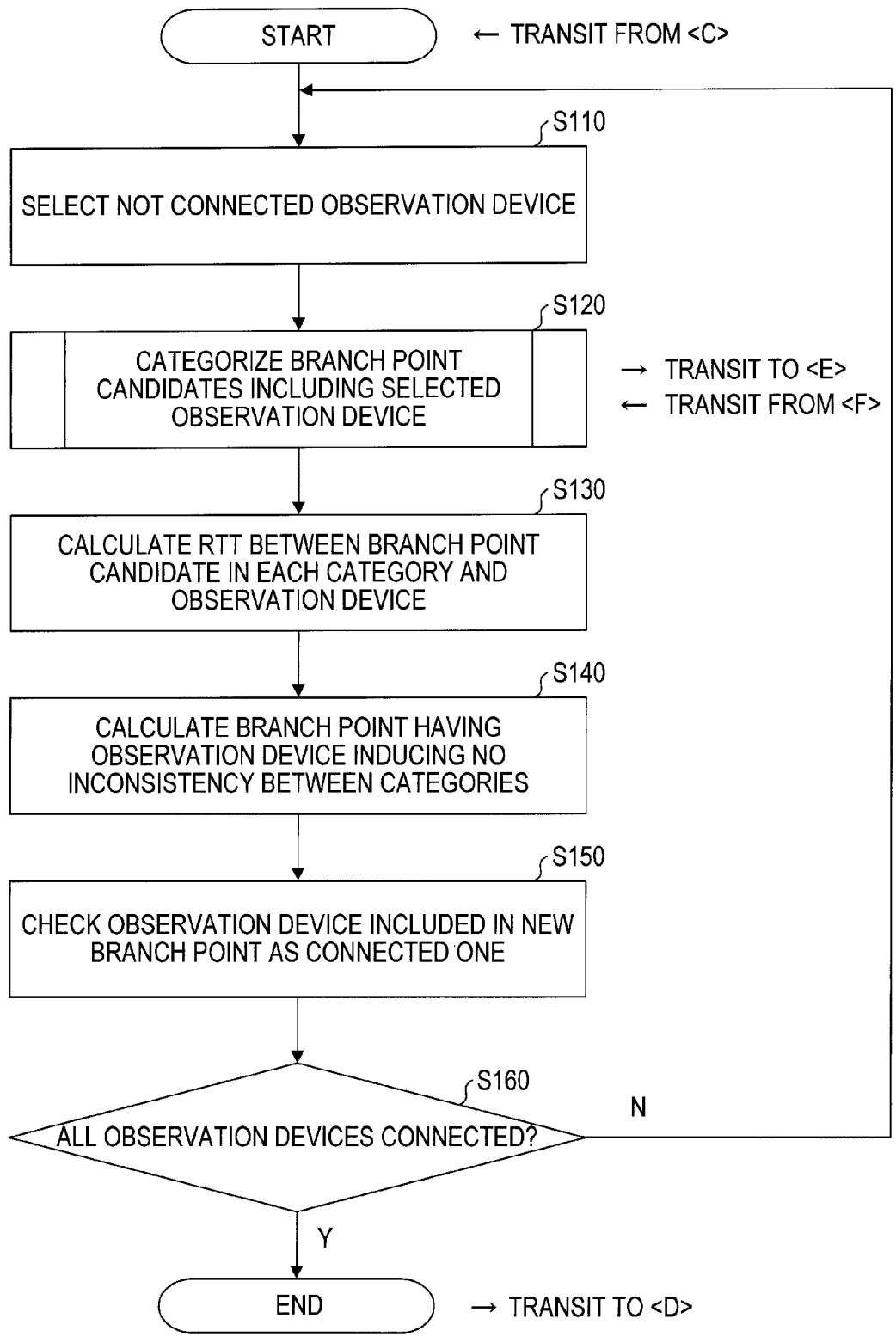
FIG. 8 is a flowchart of a process of uniting together branch point candidates according to an embodiment.
Figure 9:
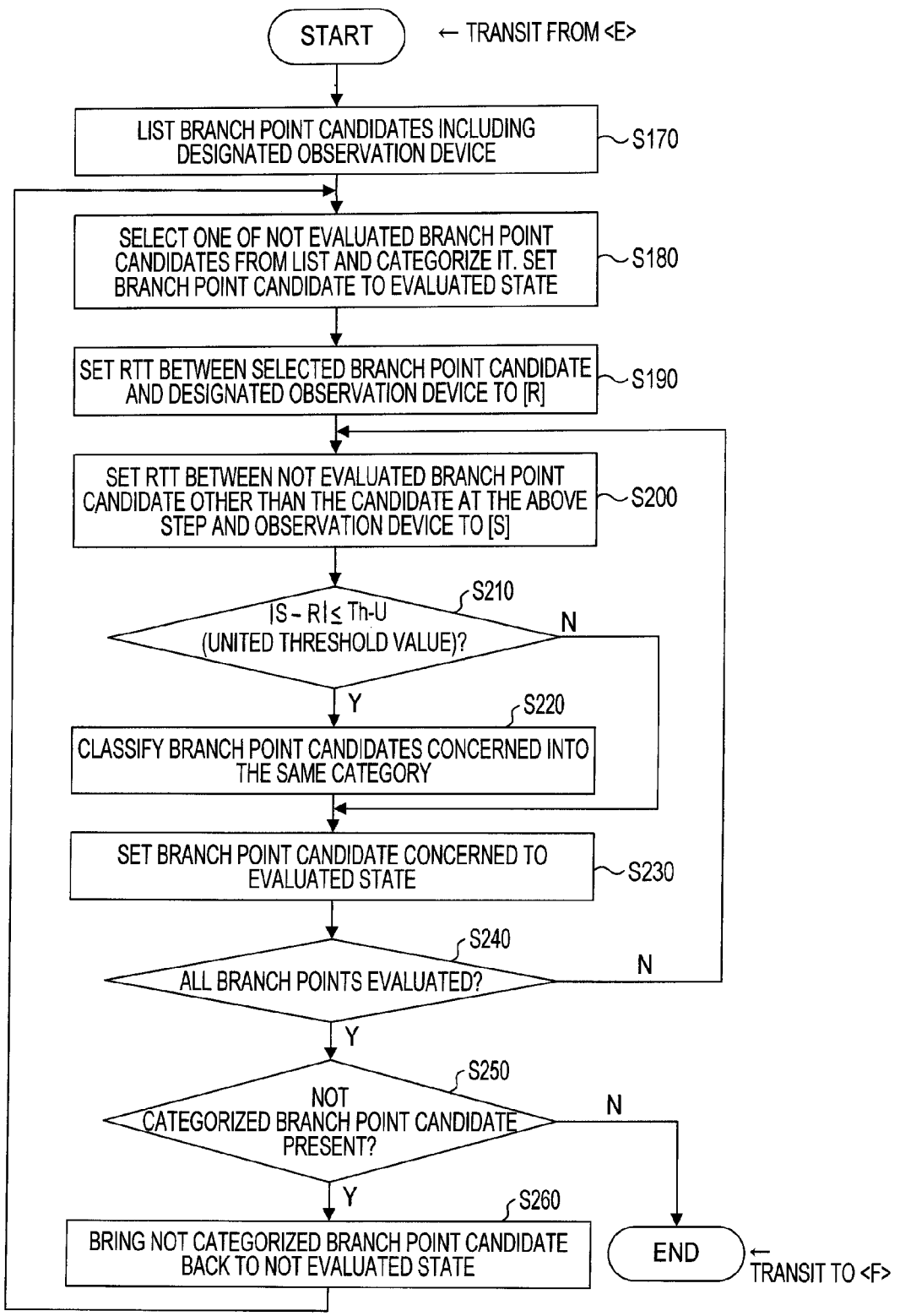
FIG. 9 is a flowchart of a process of categorizing branch point candidates according to an embodiment.

Next, a process of uniting together branch point candidates will be described with reference to FIGS. 6, 8 and 9. In this process, branch point candidates disposed in the vicinity of each other are united together as the same candidate. At S30, each of the grouping means 130, the representative value calculating means 140 and the connection state estimating means 150 executes the process of uniting together the branch point candidates. Also, at S30, the connection state estimating device 100 generates a list of observation devices as illustrated in FIG. 12. The observation device list illustrated in FIG. 12 retains information as to whether each observation device is connected with the united branch point candidate, that is, whether a connecting state of the observation device with the united branch point candidate is settled. [Connected] and [Not Connected] in FIG. 12 are flags indicating whether the observation device concerned has been connected with the united branch point candidate per observation device. All the flags concerned indicate [Not Connected] in their initial states. Next, detailed description will be made on processes executed respectively using the grouping means 130, the representative value calculating means 140 and the connection state estimating means 150 at S30.

At S110, the grouping means 130 selects one observation device whose connection state flag indicates [Not Connected] from the observation device list illustrated in FIG. 12. In the example illustrated in the drawing, description will be made on the assumption that the grouping means 130 selects the observation device A and the observation device (in the example, the device A) selected using the grouping means 130 is referred to as a target observation device. FIG. 12 illustrates observation device A as being [Connected] resulting from the processing to be described as follows. It is noted that observation device A may be indicated as [Not Connected] at the selection of step S110.

At S120, the grouping means 130 classifies all the branch point candidates connected with the target observation device into respective categories. Next, detailed description will be made on the process executed using the grouping means 130 at S120 with reference to FIG. 9. Incidentally, a general clustering algorithm (for example, a K averaging method) may be used, instead of the method as illustrated in FIG. 9.

At S170, the grouping means 130 prepares a list of all the branch point candidates connected with the target observation device as illustrated in FIG. 13. In the example, the list illustrated in FIG. 13 will be referred to as a category list. In the category list, the branch point candidates are disposed in a line direction and respective lines have respective columns of [Branch Point Candidate ID], [RTT between Branch Point Candidate and Each Observation Device], [Category ID] and [Evaluation Flag]. As illustrated in FIG. 13, in the initial state of the category list, the columns of [Category ID] and [Evaluation Flag] are blank.

At S180, the grouping means 130 selects one branch point candidate whose evaluation flag column is blank from the category list. In the example illustrated in the drawing, it is assumed that the grouping means 130 selects the branch point candidate X1. Then, at S180, the grouping means 130 sets [C1] in the column of the category ID of the branch point candidate X1 and sets [Settled] in the column of the evaluation flag of the branch point candidate X1.

At S190, the grouping means 130 sets the RTT between the branch point candidate X1 selected at S180 and the target observation device A to [R]. In the example, R=10.

At S200, the grouping means 130 selects one branch point candidate which is different from the branch point candidate X1 selected at S180 and is not set [Settled] in the column of the evaluation flag in the category list. In the example, it is assumed that the branch point candidate X2 is selected using the grouping means 130. Then, at S190, the grouping means 130 sets the RTT between the branch point candidate X2 selected at S190 and the target observation device A to [S]. In the example, S=10.

At S210, the grouping means 130 compares [R] with [S]. That is, the grouping means 130 evaluates whether the branch point candidates X1 and X2 are disposed in the vicinity of each other at S210. Then, the grouping means 130 sets in advance a united threshold value (hereinafter, referred to as Th-U) and then, in the case that S is within a range of R±Th-U, it proceeds to the process at S220 (Yes at S210). While, in the case that S is not within the range of R±Th-U, it proceeds to the process at S230 (No at S210). In the process example illustrated in the drawing, S=R, so that the answer is "Yes" at S210 and the grouping means 130 proceeds to the process at S220.

At S220, the grouping means 130 judges that the branch point candidate X2 selected at S200 belongs to the same category as the branch point candidate X1 and gives the same category ID [C1] as that of the branch point candidate X1 to the branch point candidate X2 as illustrated in FIG. 16.

At S230, the grouping means 130 sets the evaluation flag of the branch point candidate X2 selected at S200 in the category list to [Settled].

At S240, the grouping means 130 performs the processes at S200 to S230 on all the branch point candidates included in the category list. At S240, it is judged whether the process proceeds from S200 to S230 with reference to the evaluation flag column of each branch point candidate. FIG. 16 illustrates a list of categories prepared by performing the processes at S200 to S230 on the branch point candidates X1 to X9 in order. FIG. 17 illustrates that since a branch point candidate X10 has been judged not to be present in the vicinity as a result of comparison at S210, the process to be performed on the candidate X10 at S220 is skipped and hence the category ID is not given to the branch point candidate X10.

At S250, the grouping means 130 judges whether categorization of all the branch point candidates has been completed. When the category IDs are given to all the branch point candidates with reference to the category list, the grouping means 130 judges that the categorization of all the branch point candidates has been completed (No at step S250), it proceeds to the process at S130. On the other hand, in the case that there exists a branch point candidate to which no category ID is given, the grouping means 130 judges that the categorization of all the branch point candidates is not completed (Yes at S250) and proceeds to the process at S260.

At S260, the grouping means 130 returns the evaluation flag column in the category list of a branch point candidate to which the category ID is not given in the category list to the blank state and proceeds to the process at S180. Accordingly, the grouping means 130 will come to execute again the categorization. FIG. 18 illustrates that the branch point candidates X10, which has not been categorized in the list in FIG. 17, has been classified to the category ID [C2].

At S130, the representative value calculating means 140 assumes one branch point candidate for each category given by execution of the process (the process described with reference to FIG. 9) at S120 and calculates the RTT between each branch point candidate so assumed and each observation device. In the example illustrated in the drawing, the RTT is calculated by a predetermined calculating method of obtaining the average value, the maximum value or the minimum value of the RTTs between each of branch point candidates included in the same category and each observation device. Incidentally, the RTT calculated using the representative value calculating means 140 at S130 corresponds to a representative value of a network distance.

Then, at S130, the representative value calculating means 140 enters the RTTs calculated in units of categories and observation devices in a category representative value list as illustrated in FIG. 20. In the category representative value list illustrated in FIG. 20, each line corresponds to each category (for example, [C1] or [C2]) and the RTT from each branch point candidate in each category to each observation device are retained.

At S140, the connection state estimating means 150 selects the most appropriate connecting relation from the relations in the respective categories classified at S120 with respect to one target observation device. Specifically, the connection state estimating means 150 compares with each other the RTTs of the respective observation devices in a line direction, that is, between the categories in the category representative value list and selects the line (category) in which only one RTT value is entered. Then, the connection state estimating means 150 estimates that an observation device for which only one RTT value is entered is connected with the branch point candidate corresponding to the selected category with the RTT concerned. That is, the connection state estimating means 150 performs the above mentioned comparing process on observation devices other than the target observation device and estimates that the target observation device is connected with the above mentioned branch point candidate with the RTT in the selected category. As a result of execution of the process at S140, the branch point candidate is estimated as a branch point.

In the example illustrated in FIG. 20, the observation devices E and F have the RTT values in both of the category IDs [C1] and [C2] and hence are regarded not to be connected with the branch point candidate. Incidentally, the observation device A is the target device and hence is not subjected to the comparing process. As a result, a branch point Y1 is estimated as the branch point candidate. In another embodiment, in the case that a difference between the RTTs to be compared with each other is within a range of a predetermined threshold value, a process of regarding an observation device concerned to be connected with the branch point candidate may be performed.

Next, at S140, the connection state estimating means 150 enters results of execution of the above mentioned process in a branch point list as illustrated in FIG. 22. For example, at S140, the connection state estimating means 150 enters data on the first line in the list illustrated in FIG. 22 on the basis of the category representative value list illustrated in FIG. 20. The first line in the list in FIG. 22 indicates that the observation devices A, B, C and D are estimated to be respectively connected with the branch point having the branch point ID [Y1] with the RTT values 10, 12, 15 and 12.

At S150, the connection state estimating device 100 enters [Connected] in the column of an observation device which has been already connected with the branch point concerned at S140 in the list of observation devices as illustrated in FIG. 12. The list in FIG. 12 indicates that the observation devices A, B, C and D have been already connected with the branch point concerned as a result of estimation of the branch point using the observation device A as the target observation device.

At S160, the connection state estimating device 100 repeats the processes at S110 to S150 with reference to the observation device list as illustrated in FIG. 12 until [Connected] is entered in the columns of all the observation devices. Incidentally, each of FIGS. 14, 19, 21 and the second line of FIG. 22 indicates a result of execution of the process at each stage in the case that the observation device E has been selected as the target observation device (corresponding to the branch point ID [Y2]). In this connection, FIG. 14 corresponds to FIG. 13, FIG. 19 corresponds to FIG. 18 and FIG. 21 corresponds to FIG. 20. The second line in FIG. 22 indicates that the connection state estimating device 150 estimates that the observation devices E and F are connected with the branch point designated by the branch point ID [Y2] respectively with the RTT values 10 and 8.

(4) Connection Between Branch Points

Next, description will be made on a process of connecting together respective branch points with reference to FIG. 22. In the connecting process, respective branch points which have been estimated at steps S10 to S30 are connected with each other and the process of estimating the branch point performed at steps from S10 to S30 is repeated as required.

At S40, the connection state estimating device 100 confirms the number of branch points which have been estimated at steps S10 to S30. That is, the connection state estimating device 100 counts the number of branch point IDs in the branch point list illustrated in FIG. 22. At S40, in the case that the number of estimated branch points is one (Yes at S40), the connection state estimating device 100 estimates that all the observation devices are connected together at the branch point concerned and each observation device is connected with the branch point concerned with each RTT value in the branch point list illustrated in FIG. 22. As described above, the connection state estimating device 100 according to an embodiment may be capable of automatically estimating the connection state between devices with no experience and help by utilizing the network distance such as the RTT between devices in a communication network including a plurality of devices.

On the other hand, in the case that the number of estimated branch points is two or more at S40 (No at S40), at S50, the connection state estimating device 100 calculates the RTT between the respective branch points which have been estimated at steps S10 to S30. The RTT between the branch points is calculated by subtracting the RTT between each observation device and each branch point from the RTT between two observation devices connected together at the branch point concerned. For example, in the example illustrated in FIG. 22, the RTT between the branch points Y1 and Y2 is obtained by calculating [RTT between A and E−RTT between Y1 and A−RTT between Y2 and E] or [RTT between B and E−RTT between Y1 and B−RTT between Y2 and E]. A plurality of values are calculated depending on the way of selecting the observation devices used in calculation as the values of the RTT between the same pair of branch points, so that any one of the average value, the minimum value and the maximum value of the plurality of calculated values is adopted.

Figure 23:
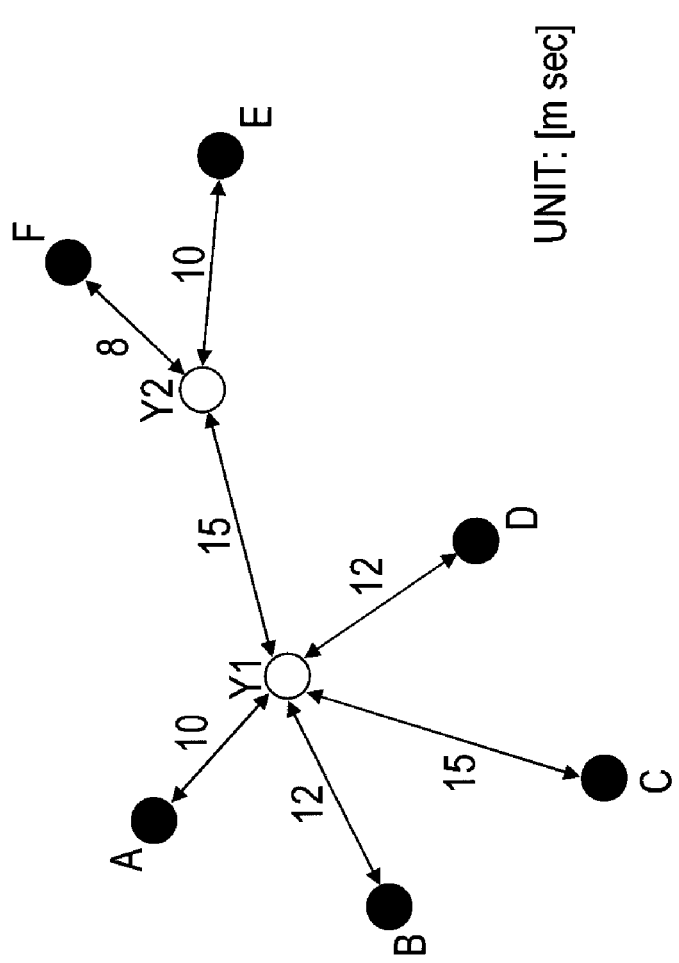
FIG. 23 illustrates RTTs between each observation device and each branch point and between respective branch points in a process according to an embodiment.

Next, FIG. 23 illustrates the finally obtained RTT values between each observation device and each branch point illustrated in FIG. 22 and between the respective branch points. Incidentally, the RTT between the branch points Y1 and Y2 illustrated in FIG. 23 is calculated from the expression [RTT between A and E−RTT between Y1 and A−RTT between Y2 and E].

At S60, in the case that the number of estimated branch points is two (Yes at S60), the connection state estimating device 100 estimates that two branch points are connected together with the RTT value calculated at S50. Then the connection state estimating device 100 estimates that the respective observation devices are connected with each other via one or two branch point(s). The connection state estimating device 100 according to an embodiment may be capable of automatically estimating the connection state of devices connected together via two branch points with no experience and help in a communication network including a plurality of devices.

At S60, in the case that the number of estimated branch points is three or more (No at S60), the connection state estimating device 100 regards each of these three or more branch points as the observation device and executes again the processes at S20 to S50 to estimate the connection states of these branch points. Since the connection state between each branch point and each observation device is estimated by executing the processes at S10 to S50, the connection states of all the devices in the communication network are estimated by executing again the processes at S20 to S50. The connection state estimating device according to an embodiment may be capable of automatically estimating the complicated connection state between devices with no experience and help in a communication network including a plurality of devices.

(5) Calculation of United Threshold Value Used in Grouping Means 130

The united threshold value Th-U used in the grouping means 130 at S210 may need to be appropriately set in accordance with the size of a communication network which is to be a processing object of the connection state estimating device 100, that is, a range of RTTs between observation devices concerned. Then, the connection state estimating device 100 may be capable of reducing the labor on a user by automatically setting the united threshold value by a method which will be described hereinbelow, instead of appropriately setting the united threshold value by the user.

The threshold value calculating means 160 for automatically setting the united threshold value calculates a value obtained by dividing the average value of the RTTs between the observation devices by M or a value obtained by multiplying the average value and $10^{-M}$ and sets the calculated value as the united threshold value Th-U. Incidentally, M is a numerical value indicative of accuracy and the user sets in advance the M concerned. The M need not be changed once it has been set by the user. Accordingly, in the case that the connection state estimating device 100 is to be applied to a plurality of communication networks, the user need not set a parameter (the united threshold value Th-U) each time.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present inventions has been described in detail, it should be understood that various changes, substitutions, and alterations could be made hereto without departing from the spirit and scope of the invention.

What is claimed is:

1. A non-transitory computer readable storage medium for storing a connection state estimating program for making a computer execute the steps of:
    acquiring a network distance between respective devices in a communication network including a plurality of devices using inter-device distance acquiring means;
    assuming branch point candidates at each of which three devices extracted from the plurality of devices are connected together and calculating the network distance between each of the assumed branch point candidates and each of the extracted three devices connected together at said each assumed branch point candidate using candidate distance calculating means;
    classifying all the branch point candidates assumed to be connected with one of the devices into groups on the basis of the network distance between one of the devices and each branch point candidate using grouping means;
    calculating representative values of the network distances calculated using the candidate distance calculating means per group of the branch point candidates classified using the grouping means and per device assumed to be connected with each of the branch point candidates belonging to one of the groups using representative value calculating means; and
    selecting one or more devices from within the devices assumed to be connected with any one of all the branch point candidates and the representative value relating to each device on the basis of a result of calculation of the representative value obtained for each device and regarding the representative value relating to each of the selected devices as the network distances between each of the selected devices and the one branch point candidate, established as a branch point, at which all the selected devices are connected together using network connection state estimating means.

2. The storage medium according to claim 1, wherein
    in the case that two or more branch points are established, the two or more established branch points are regarded to be connected together and the network distance between the respective branch points is calculated on the basis of the network distance between the respective devices and the network distance between each of the branch points and each of the devices.

3. The storage medium according to claim 2, wherein
    in the case that three or more branch points are established, each established branch point is regarded as one of the plurality of devices to execute the respective steps using the candidate distance calculating means, the grouping means, the representative value calculating means and the network connection state estimating means.

4. The storage medium according to claim 1, further comprising the step of
    in the case that the grouping means classifies the branch point candidates whose difference in network distance between one of the devices and each of the branch point candidates is less than a predetermined threshold value into a same group, calculating the predetermined threshold value using threshold value calculating means on the basis of an average value of the network distances acquired using the inter-device distance acquiring means.

5. A connection state estimating device comprising:
    inter-device distance acquiring means for acquiring a network distance between respective devices in a communication network including a plurality of devices;
    candidate distance calculating means for assuming branch point candidates at each of which three devices extracted from the plurality of devices are connected together and calculating the network distance between each of the assumed branch point candidates and each of the extracted three devices connected together at said each assumed branch point candidate;
    grouping means for classifying all the branch point candidates assumed to be connected with one of the devices into groups on the basis of the network distance between one of the devices and each branch point candidate;
    representative value calculating means for calculating representative values of the network distances calculated using the candidate distance calculating means per group of the branch point candidates classified using the grouping means and per device assumed to be connected with each of the branch point candidates belonging to one of the groups; and
    network connection state estimating means for selecting one or more devices from within the devices assumed to be connected with any one of all the branch point candidates and the representative value relating to each device on the basis of a result of calculation of the representative value obtained for each device and regarding the representative value relating to each of the selected devices as the network distances between each of the selected devices and the one branch point candidate, established as a branch point, at which all the selected devices are connected together.

6. The connection state estimating device according to claim 5, wherein
    in the case that two or more branch points are established, the two or more established branch points are regarded to be connected together and the network distance between the respective branch points is calculated on the basis of the network distance between the respective devices and the network distance between each of the branch points and each of the devices.

7. The connection state estimating device according to claim 6, wherein
    in the case that three or more branch points are established, each established branch point is regarded as one of the plurality of devices to execute the respective steps using the candidate distance calculating means, the grouping means, the representative value calculating means and the network connection state estimating means.

8. The connection state estimating device according to claim 5, further comprising
    threshold value calculating means for, in the case that the grouping means classifies the branch point candidates whose difference in network distance between one of the devices and each of the branch point candidates is less than a predetermined threshold value into a same group, calculating the predetermined threshold value on the basis of an average value of the network distances acquired using the inter-device distance acquiring means.

9. A connection state estimating method comprising the steps of:
acquiring a network distance between respective devices in a communication network including a plurality of devices using inter-device distance acquiring means;
assuming branch point candidates at each of which three devices extracted from the plurality of devices are connected together and calculating the network distance between each of the assumed branch point candidates and each of the extracted three devices connected together at said each assumed branch point candidate using candidate distance calculating means;
classifying all the branch point candidates assumed to be connected with one of the devices into groups on the basis of the network distance between one of the devices and each branch point candidate using grouping means;
calculating representative values of the network distances calculated using the candidate distance calculating means per group of the branch point candidates classified using the grouping means and per device assumed to be connected with each of the branch point candidates belonging to one of the groups using representative value calculating means; and
selecting one or more devices from within the devices assumed to be connected with any one of all the branch point candidates and the representative value relating to each device on the basis of a result of calculation of the representative value obtained for each device and regarding the representative value relating to each of the selected devices as the network distances between each of the selected devices and the one branch point candidate, established as a branch point, at which all the selected devices are connected together using network connection state estimating means.

10. The connection state estimating method according to claim 9, wherein
in the case that two or more branch points are established, the two or more established branch points are regarded to be connected together and the network distance between the respective branch points is calculated on the basis of the network distance between the respective devices and the network distance between each of the branch points and each of the devices.

11. The connection state estimating method according to claim 10, wherein
in the case that three or more branch points are established, each established branch point is regarded as one of the plurality of devices to execute the respective steps using the candidate distance calculating means, the grouping means, the representative value calculating means and the network connection state estimating means.

12. The connection state estimating method according to claim 9 further comprising the step of
in the case that the grouping means classifies the branch point candidates whose difference in network distance between one of the devices and each of the branch point candidates is less than a predetermined threshold value into a same group, calculating the predetermined threshold value using threshold value calculating means on the basis of an average value of the network distances acquired using the inter-device distance acquiring means.

* * * * *